US011028273B2

(12) United States Patent
Evens et al.

(10) Patent No.: US 11,028,273 B2
(45) Date of Patent: Jun. 8, 2021

(54) PRIMER SATURATED CARRIER MEDIUM ASSEMBLY AND METHOD OF APPLYING TO A SURFACE

(71) Applicant: The Boeing Company, Chicago, IL (US)

(72) Inventors: Michael W. Evens, Burien, WA (US); Megan N Watson, North Charleston, SC (US); Joel P. Baldwin, Seattle, WA (US); Marcus A. Belcher, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 1264 days.

(21) Appl. No.: 14/243,959

(22) Filed: Apr. 3, 2014

(65) Prior Publication Data

US 2015/0284570 A1  Oct. 8, 2015

(51) Int. Cl.
*C09D 5/00* (2006.01)
*C09D 5/08* (2006.01)
(Continued)

(52) U.S. Cl.
CPC ............... *C09D 5/002* (2013.01); *C09D 5/08* (2013.01); *C09D 5/20* (2013.01); *B32B 37/12* (2013.01); *B32B 37/1207* (2013.01); *B32B 38/0008* (2013.01); *B32B 38/08* (2013.01); *B32B 38/10* (2013.01); *B32B 2037/1253* (2013.01); *B32B 2305/20* (2013.01); *B32B 2307/752* (2013.01); *B32B 2310/0825* (2013.01);
(Continued)

(58) Field of Classification Search
CPC ........... C09D 5/00; B32B 37/02; B32B 37/12; B32B 2037/1253

USPC .................................................... 442/59, 179
See application file for complete search history.

(56) References Cited

U.S. PATENT DOCUMENTS 4,522,889 A * 6/1985 Ebneth .................. B64D 45/02
244/1 A
5,166,007 A * 11/1992 Smith ..................... B29C 73/10
428/63
(Continued)

OTHER PUBLICATIONS

"MIL-PRF-23377H Type 1, Class C Polyamide Epoxy Primer—Aircraft" available at http://web.archive.org/web/20090106025823/http://www.pwpaints.com/images/downloads/mil-p-23377h.pdf.*
(Continued)

*Primary Examiner* — Peter Y Choi
(74) *Attorney, Agent, or Firm* — Patterson + Sheridan, LLP

(57) ABSTRACT

The present disclosure is generally directed to a primer saturated carrier medium assembly including a carrier medium having a front face and an opposing rear face, a primer saturating the carrier medium between the front face and the opposing rear face, and removable film impenetrable to the primer covering opposite faces of the carrier medium. A method of applying primer to a surface includes applying a face of a primer saturated carrier medium to contact a surface, and curing the primer saturated carrier medium on the surface. A structure includes a primer saturated medium including a carrier medium having a front face and an opposing rear face, and a primer saturating the carrier medium between the front face and the opposing rear face. The structure further includes a surface adhered to the primer on one face of the primer saturated medium.

20 Claims, 7 Drawing Sheets

(51) Int. Cl.
*C09D 5/20* (2006.01)
*B32B 37/12* (2006.01)
*B32B 38/00* (2006.01)
*B32B 38/10* (2006.01)
*B32B 38/08* (2006.01)

(52) U.S. Cl.
CPC ... *B32B 2310/0831* (2013.01); *B32B 2556/00* (2013.01); *Y10T 442/60* (2015.04); *Y10T 442/655* (2015.04); *Y10T 442/674* (2015.04); *Y10T 442/675* (2015.04)

(56) References Cited

U.S. PATENT DOCUMENTS

2008/0254698 A1* 10/2008 Yao .................. C09J 7/0296
 442/181
2010/0062250 A1* 3/2010 Johnson ............. C09D 5/086
 428/354

OTHER PUBLICATIONS

"Performance Specification for MIL-PRF-23377K" available at http://chemsol.com/wp-content/uploads/2013/09/MIL-PRF-23377K.pdf.*

* cited by examiner

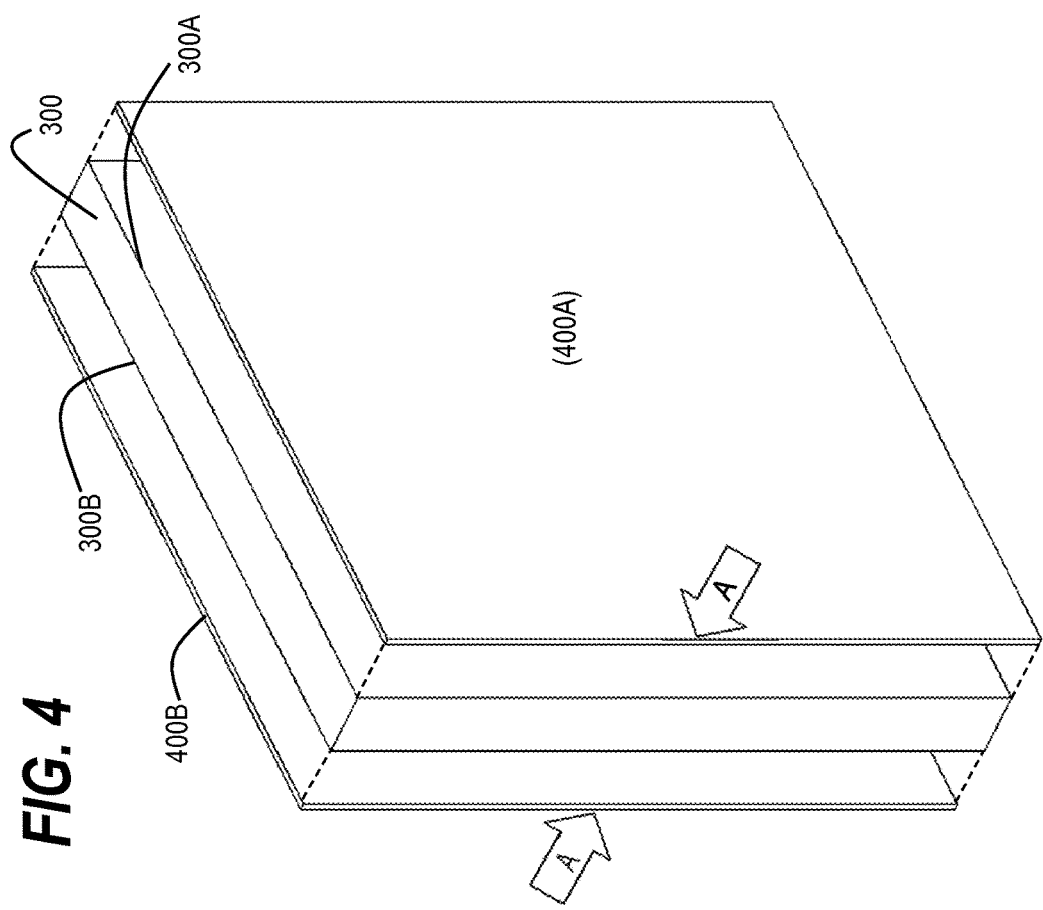
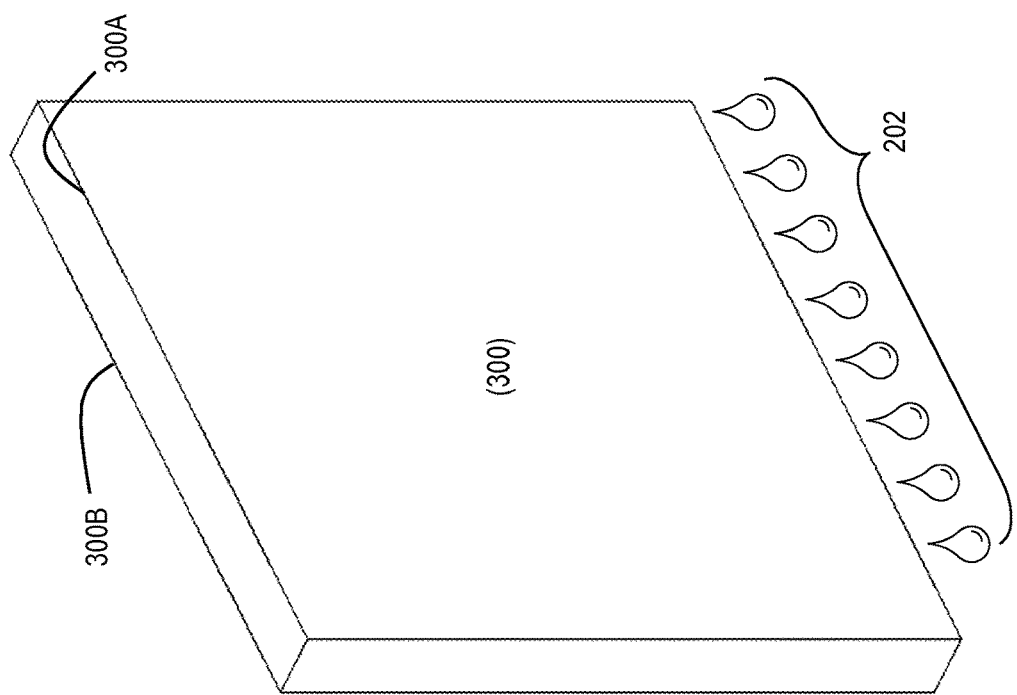

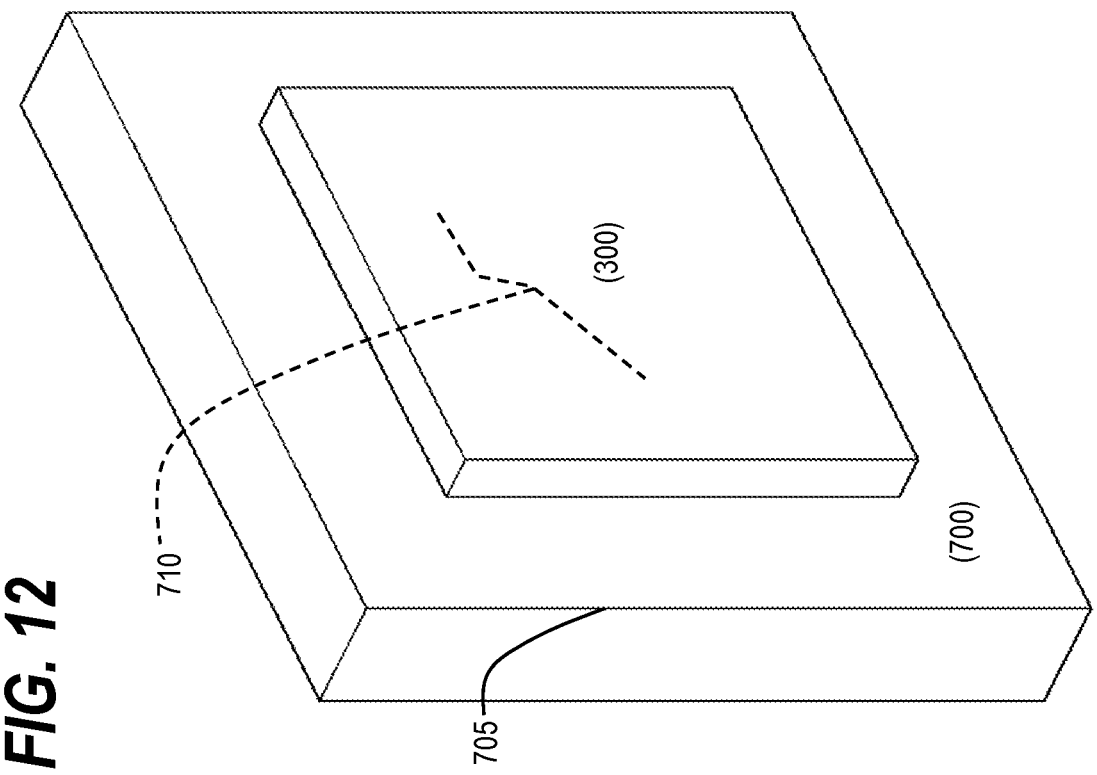
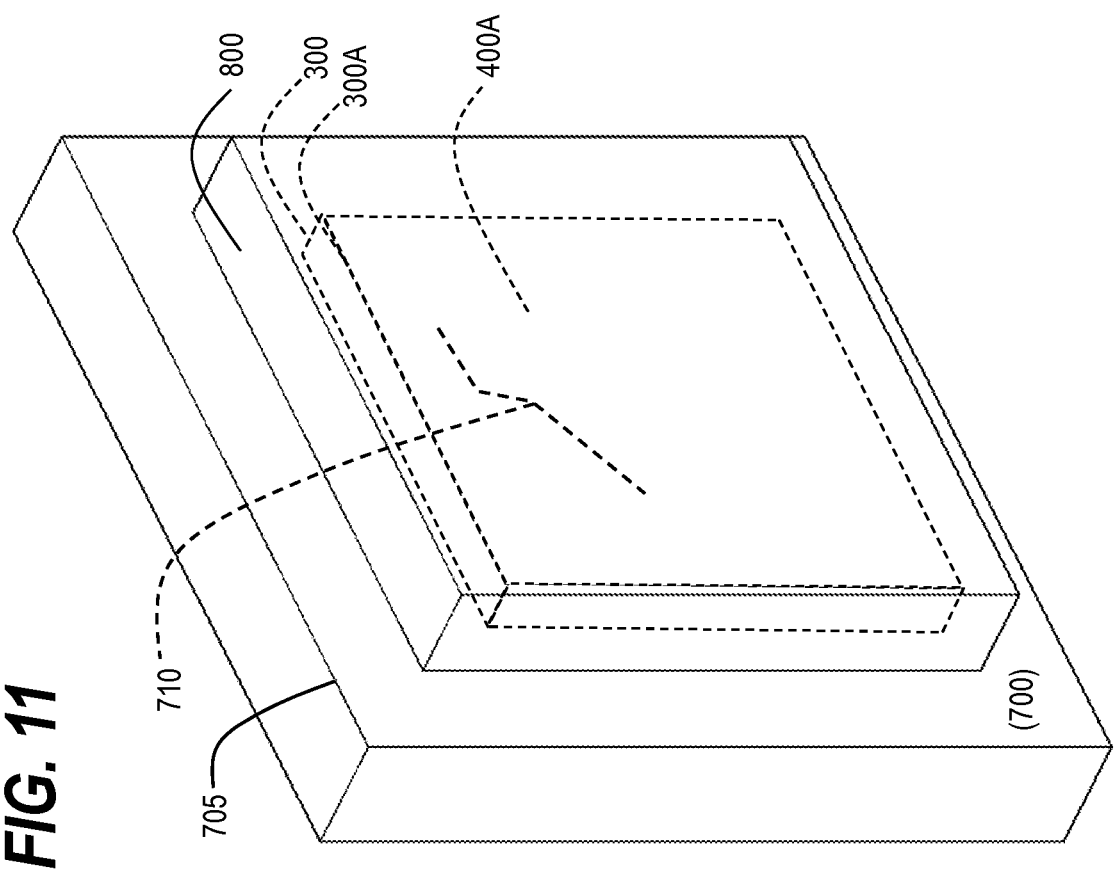

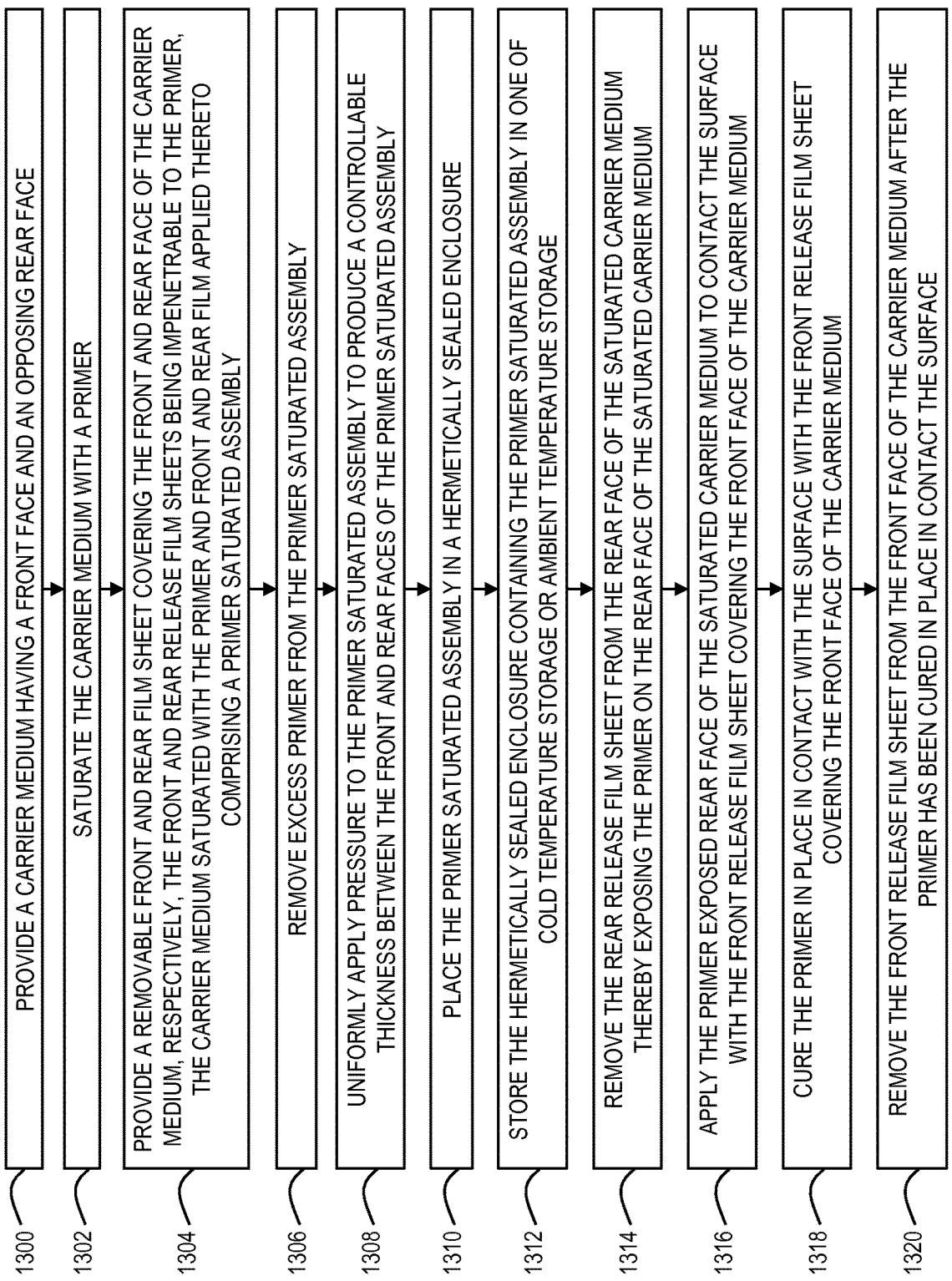

PRIMER SATURATED CARRIER MEDIUM ASSEMBLY AND METHOD OF APPLYING TO A SURFACE

TECHNICAL FIELD

The field of the embodiments presented herein is directed toward the creation of a primer saturated carrier medium assembly and method of applying the same to a surface.

BACKGROUND

A variety of primers are used for repairs, for example on the surfaces of aircraft structures prior to applying adhesive and a repair patch to the structure. Current methods for applying primer present both environmental and human-safety contact concerns. Typically, a technician spraying primer must be well versed in their skill to ensure the correct thickness is applied, there are no contaminants in the spray, and the primer is not over or under sprayed in an area. However, many governing jurisdictions do not allow certain spray applications due to environmental regulations and requirements because of dangerous substances in the primer. A primer brush-on technique, which may often be allowed when spraying is prohibited, may be also more difficult to control because brush-on application disperses primer pigments unevenly on the target surface. The application thickness of the primer may be also a critical aspect in the repair process. If the primer is too thick or too thin, there is a greater likelihood of compromised mechanical strength of the repair.

Current known methods require that primers be mixed and applied and then allowed to cure with added heat, prior to applying the adhesive and repair patch, or dried at room temperature for a given time prior to co-cure, if not fully cured first. The current process may be time consuming, further requiring that a structure being repaired, e.g., an aircraft, be out of service for longer periods of time.

Even with a co-cured process using known application methods, the sprayed/brushed primer may not be sufficiently dry to prevent shifting, which can leave a "weak" spot under the adhering region that can lead to potential bond strength concerns or a path for corrosion. A typical cure process includes applying primer by brush or spray application and allowing to dry 30-90 minutes at room temperature/ambient conditions. Co-curing may be performed with adhesive at 250° F. for 60 to 75 minutes, or a cure under infrared (IR) light for 30-60 minutes at 120° F. to 150° F., after which an adhesive and repair patch are applied. Primer may be initially wet to the touch until sufficient drying time has passed. The initial drying allows the primer to "set up" so that it may be not affected by subsequent application of the adhesive and repair patch, and will not shift.

There is a need for a primer application form that does not require spraying primer that creates environmental hazards associated with breathing fumes from the atomized bond primer, and does not require brushing application that typically results in uneven primer dispersal. Additionally, there is a need to produce a consistent bondline thickness of dried primer on the surface of the structure, to which the primer is applied, within optimal specifications, for example, a predetermined application thickness range. Further, there is a need for improved methods of application of primer to a structure, where the primer is capable of flash drying or co-curing with an adhesive system and/or a repair patch, thereby eliminating an extra primer curing step in the total repair process.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

The present disclosure is generally directed to a carrier medium having a first face and an opposing second face and a primer substantially saturating the carrier medium between the first face and the opposing second face. A removable film substantially impenetrable to the primer covers both opposite faces of the primer saturated carrier medium.

More specifically, in one embodiment disclosed herein, a method of applying primer to a surface includes removing a film impenetrable to a primer on a second face of a primer saturated carrier medium assembly. The primer saturated carrier medium assembly includes a carrier medium having a first face and an opposing second face, a primer saturating the carrier medium between the first face and the second face, and at least one removable film impenetrable to the primer covering an opposing face of the carrier medium. The face of the primer saturated carrier medium assembly is applied to contact a surface, and the primer saturated carrier medium is cured on the surface.

More specifically, in one embodiment disclosed herein, a structure includes a primer saturated medium having a carrier medium having a first face and an opposing second face, and a primer substantially saturating the carrier medium between the first face and the opposing second face, the primer saturated medium capable of adhering to a surface at one face of the primer saturated medium.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 3 illustrates the first configuration of the saturated carrier medium and the elimination of excess primer therefrom, according to at least one embodiment disclosed herein;

FIG. 4 illustrates the first configuration of removable films positioned for applying to opposite sides of the saturated carrier medium, according to at least one embodiment disclosed herein;

FIG. 11 illustrates a third configuration of a heat curing device positioned over the primer saturated carrier medium positioned in contact with the surface of the structure, according to at least one embodiment disclosed herein;

FIG. 12 illustrates the first configuration of the cured primer saturated carrier medium having one removable film removed therefrom and positioned in contact with the surface of the structure, according to at least one embodiment disclosed herein; and FIG. 13 illustrates a logic flowchart diagram of a method of applying the primer saturated medium assembly of the invention, to a surface of a structure according to at least one embodiment disclosed herein.

DETAILED DESCRIPTION

The following detailed description is directed to applying a primer to a carrier medium, for example, a positioning scrim, and covering opposing faces of the carrier medium with removable films, to form a primer saturated carrier medium assembly where the primer may then be applied to the surface of a structure via the primer saturated carrier medium. The primer, supported by the saturated carrier medium, not only resists movement after application to the structure, but additionally maintains a substantially controllable thickness being contained within the opposing outer surfaces of carrier medium. The primer saturated carrier medium may further be mechanically calendared to a predetermined controllable thickness. The primer saturated carrier medium may also act as a path to remove volatiles from the bondline between later applied adhesive and the surface of the structure receiving the primer, and may be left in place after the completion of the repair with no reduction in bond strength of the thus repaired structure.

In the method of preparing a primer saturated carrier medium assembly, a carrier medium having a first and second face is substantially saturated with a suitable primer and then both faces of the medium are covered with a protective layer which may be a sheet such as a film that is impenetrable by the primer. The primer saturated carrier medium assembly, may be hermetically sealed and stored either at room temperature or under refrigeration to extend the shelf life of the primer saturated medium. The primer saturated carrier medium assembly may be cut to the size needed, for example to cover a particular repair area. The primer saturated carrier medium assembly has one removable film removed from the primer on one side of the carrier medium, exposing the primer, and the medium may be then applied and adhered to the surface of the repair area by curing. One configuration provides for pressing the primer saturated carrier medium onto the surface of the repair area, for example, by a squeegee or any other equivalent method. Thereafter, the second removable film is either removed from the carrier medium or left on for curing, and the primer may be cured in the ambient temperature air, flash dried with a heat gun, heat cured with a thermal blanket, or cured by being exposed to infrared (IR) or ultraviolet (UV) energy. Thereafter, adhesive may be applied to the primer exposed side of the carrier medium and cured. Because the primer is substantially retained in the carrier medium, it may be less likely that the primer will be removed from or shifted around the surface of the structure by subsequent application of the adhesive and the repair patch.

Figure 1:
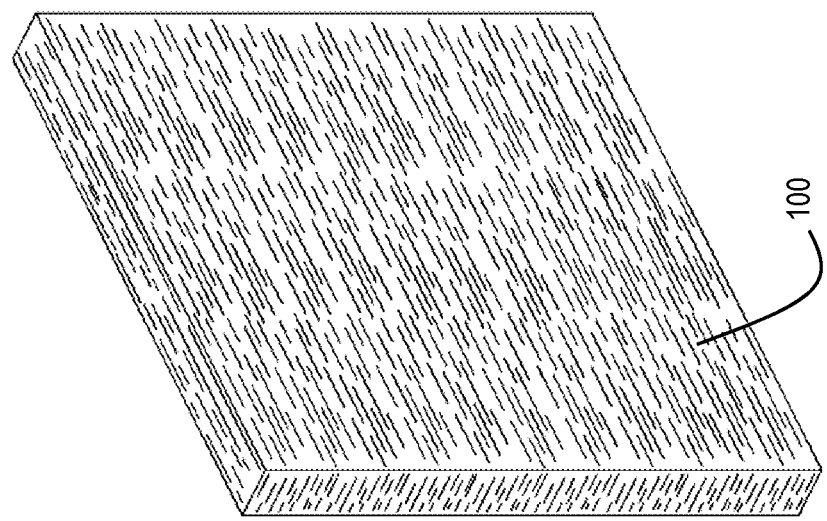
FIG. 1 illustrates a first configuration of a carrier medium, according to at least one embodiment disclosed herein.

FIG. 1 illustrates a first configuration of a carrier medium 100 used as a primer carrier. Carrier medium 100 may include any medium capable of receiving and holding a primer therein. Examples of suitable carrier medium materials may include non-woven mats made of nylon, polyester, or glass fibers. The thickness of the carrier medium may be between approximately 3 to approximately 9 thousandths of an inch. In an embodiment of where the carrier medium is made of carbon non-woven mats or metallized carbon non-woven mats, the overall thickness may be between approximately 2 to approximately 11 thousandths of an inch, with carbon fibers having a length between approximately 0.5 to approximately 1.0 inch. The carrier medium may include metallized carbon non-woven mats having carbon fibers metallized with Ni, Cu/Ni, Ag, Au, Ru and/or other metal.

Figure 2:
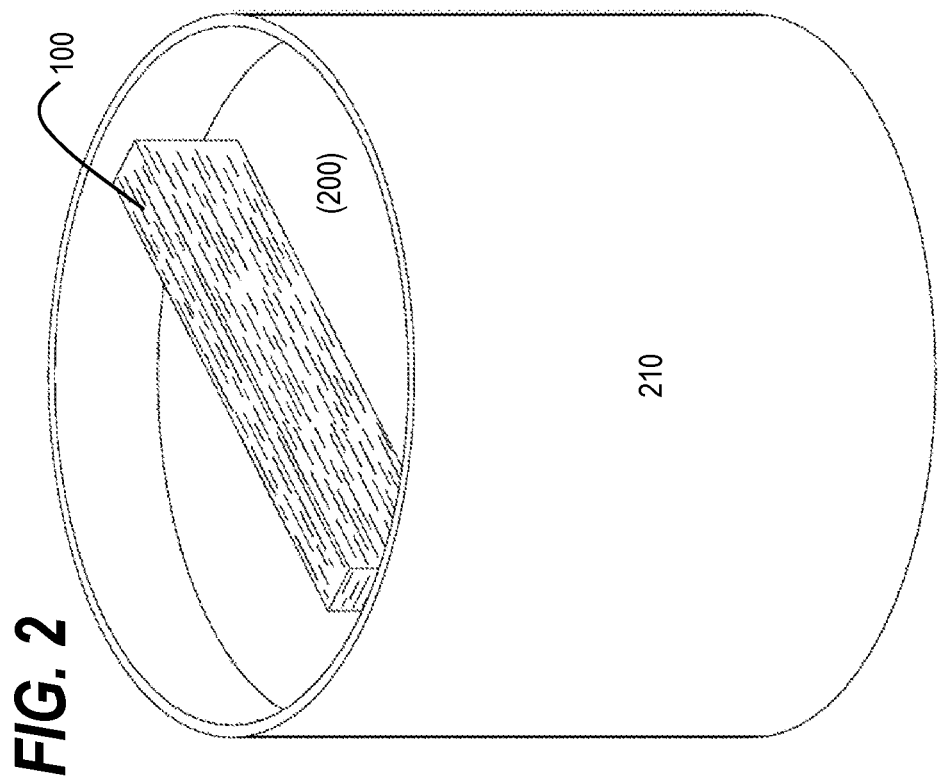
FIG. 2 illustrates the first configuration of the carrier medium being saturated with primer, according to at least one embodiment disclosed herein.

FIG. 2 illustrates the first configuration of the carrier medium 100 being saturated with primer 200 when immersed in a primer reservoir 210 containing sufficient primer 200 to cover the carrier medium 100 and fully saturating the carrier medium 100 with the primer 200. The primer may be any chromate based corrosion resistant primer or any other or non-chromate based primer that are typically used in an aerosolized form during a primer spraying application.

FIG. 3 illustrates the first configuration of the primer saturated carrier medium 300 that includes the carrier medium 100 being completely saturated with primer 200 from a first face 300A of the primer saturated carrier medium 300 to an opposing, second face 300B of the primer saturated carrier medium 300. Excess primer 202 may be eliminated from the primer saturated carrier medium 300, for example by mechanical means such as a calendaring process, (described later in FIG. 6), such that a thickness of primer 200 and carrier medium 100 may be substantially controlled between the first face 300A and the opposing, second face 300B of the primer saturated carrier medium 300.

FIG. 4 illustrates the first configuration of a first removable film 400A and an opposing, second removable film 400B being positioned to join the primer saturated carrier medium 300. Arrows A illustrate the direction of the first removable film 400A and the opposing, second removable film 400B being joined to a first face 300A and the opposing, second face 300B of the primer saturated carrier medium 300, respectively. First removable film 400A and opposing, second removable film 400B operate to contain the primer 200 the between the first face 300A and the opposing, second face 300B of the primer saturated carrier medium 300 after the primer saturated carrier medium 300 has been saturated with the primer 200. The removable nature of the first removable film 400A and opposing, second removable film 400 allows for selective removal of either film from the primer saturated carrier medium 300 without disrupting the primer 200 contained between the first face 300A and the opposing, second face 300B of the primer saturated carrier medium 300.

Figure 5:
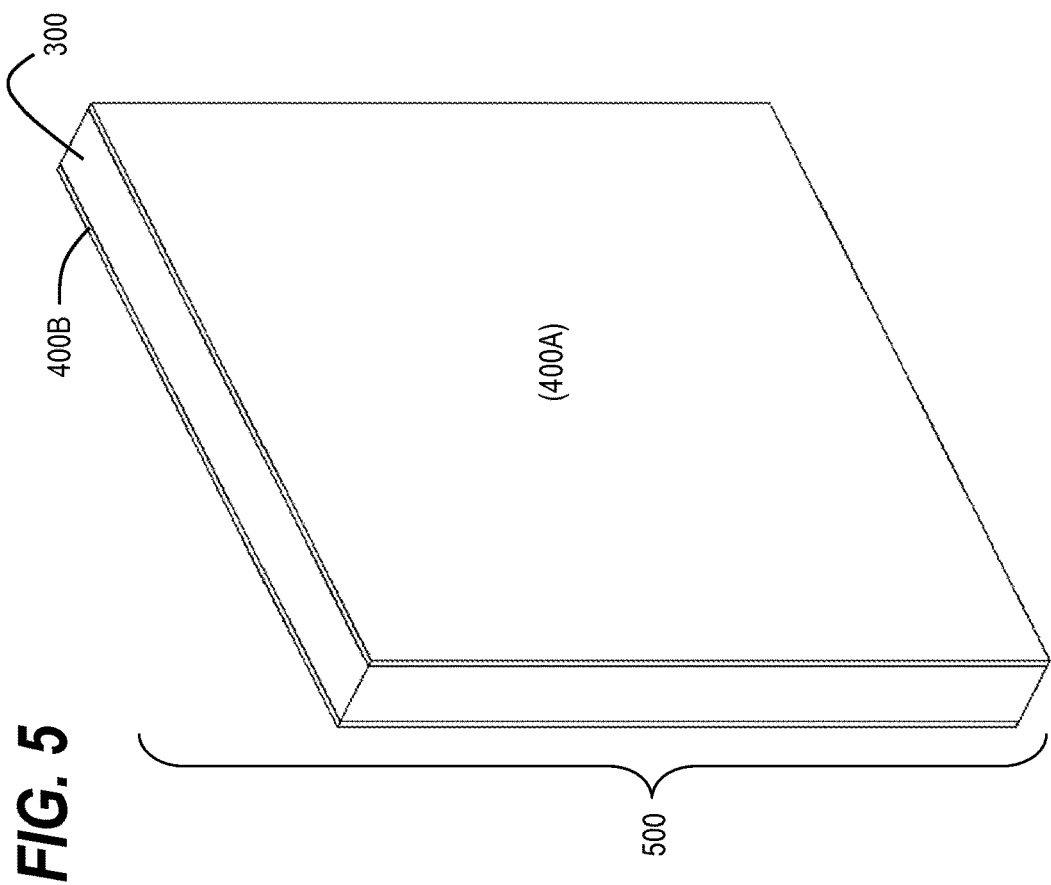
FIG. 5 illustrates a first configuration of a primer saturated medium assembly, including the primer saturated carrier medium and the adjoining removable films, according to at least one embodiment disclosed herein.

FIG. 5 illustrates the first configuration of a primer saturated medium assembly 500 that includes the primer saturated carrier medium 300 and the adjoining first removable film 400A and opposing, second removable film 400B. First removable film 400A covers the first face 300A of the primer saturated carrier medium 300 and the opposing, second removable film 400B covers the opposing, second face 300B of the primer saturated carrier medium 300 as illustrated in FIG. 4. The first removable film 400A and opposing, second removable film 400B are impenetrable to the primer 200, such that the primer 200 cannot pass through the removable film from the primer saturated carrier medium 300. First removable film 400A and opposing, second removable film 400B may be made of nylon, polyester or glass. In one embodiment, the removable films may have a thickness of 3 to 8 thousandths of an inch. A desired controllable thickness of the primer 200 is attained by maintaining the primer 200 in the primer saturated carrier medium 300 between the first face 300A and the opposing, second face 300B.

Figure 6:
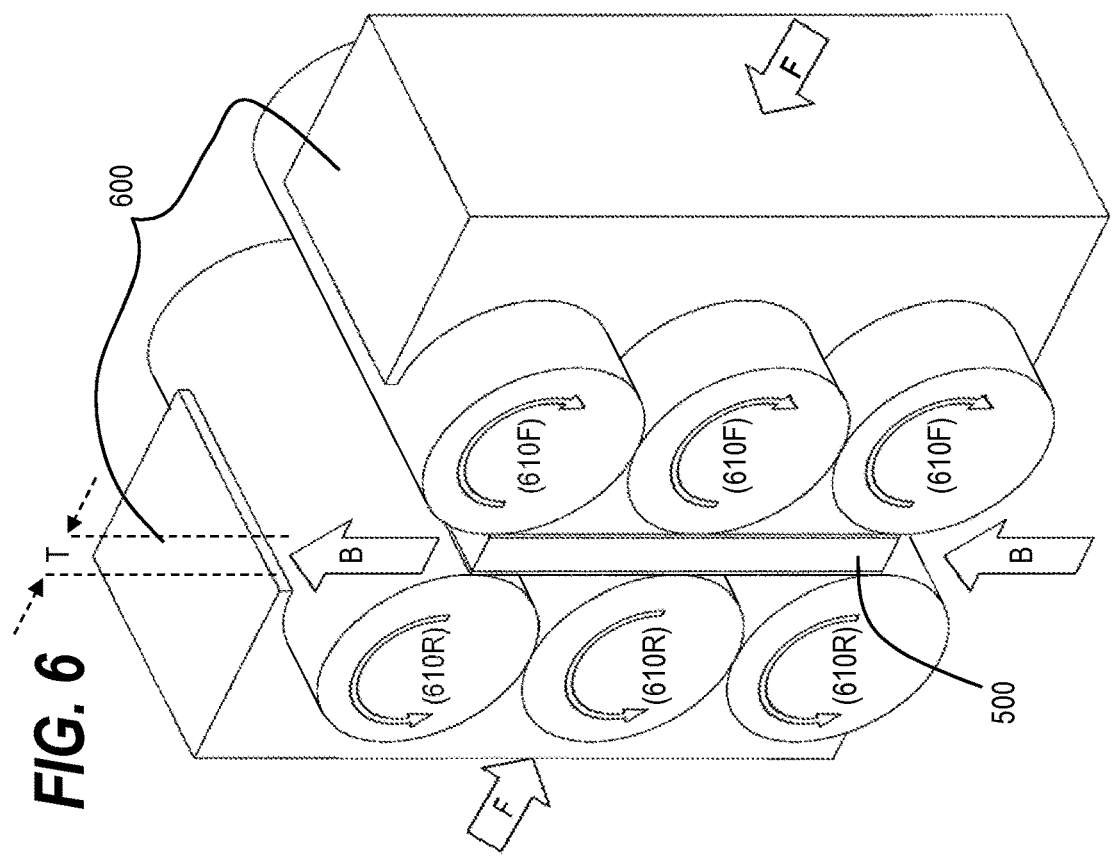
FIG. 6 illustrates a second configuration of a calendaring assembly processing the primer saturated medium assembly to a predetermined thickness, according to at least one embodiment disclosed herein.

FIG. 6 illustrates an exemplary second configuration of achieving a controllable thickness of the primer 200 maintained between the first face 300A and the opposing, second face 300B of the primer saturated carrier medium 300. In this embodiment, a calendaring assembly 600 processes the primer saturated medium assembly 500 to a predetermined thickness. Force F may be applied to the calendaring assembly 600 through the front calendaring rollers 610F and opposing, rear calendaring rollers 610R to opposing sides of the primer saturated medium assembly 500 being fed through the calendaring assembly 600. A thickness T of the calendared primer saturated medium assembly 500 may be substantially controlled across the opposing faces of the primer saturated assembly 500, upon exit from the calendaring assembly 600. Arrows in direction F of FIG. 6 illustrate the direction of the force applied to the calendaring assembly 600, to produce the desired thickness T, while the primer saturated assembly 500 moves in direction B through the calendaring assembly 600.

The primer saturated medium assembly 500 may be placed into a hermetically sealed enclosure, (not shown), to prevent primer degradation due to exposure to air and moisture, either before or after the calendaring process. The hermetically sealed primer saturated medium assembly 500 may then be stored in ambient temperature storage or cold temperature storage, to further prolong the working life of the primer 200 in the primer saturated carrier medium 300.

Figure 8:
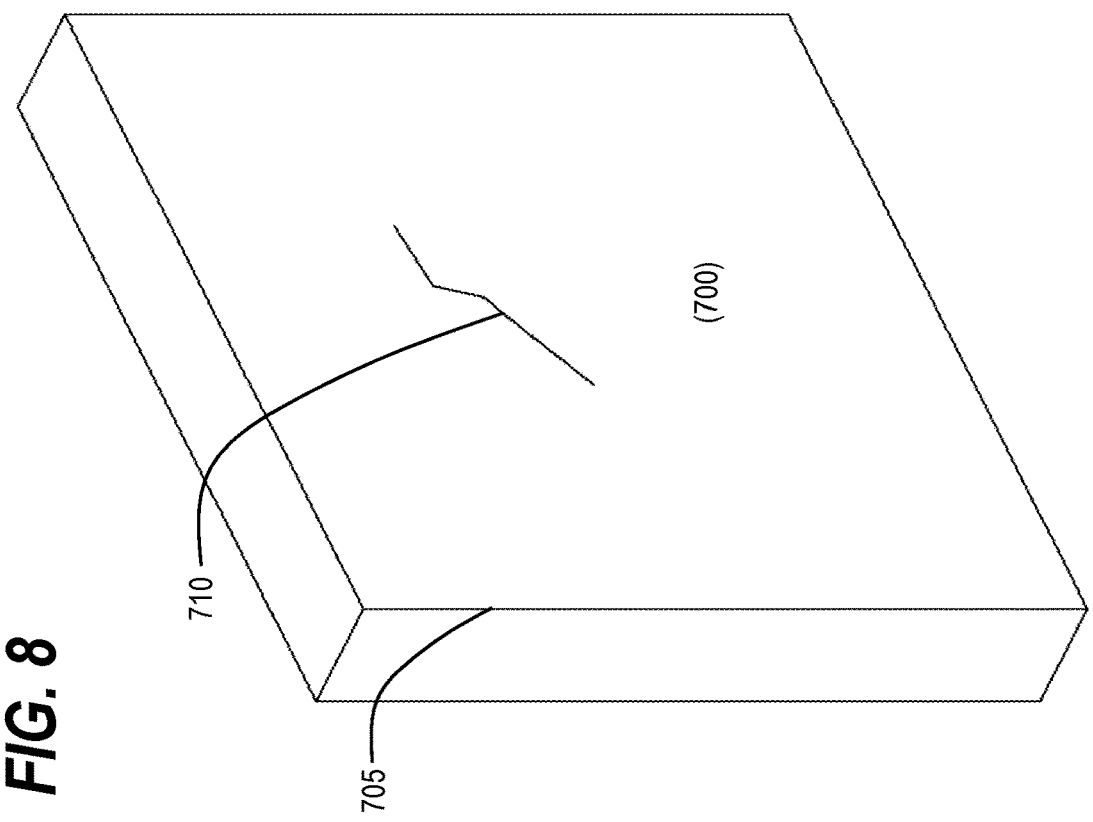
FIG. 8 illustrates the first configuration of a structure having a surface capable of receiving the primer saturated carrier medium assembly, according to at least one embodiment disclosed herein.
Figure 7:
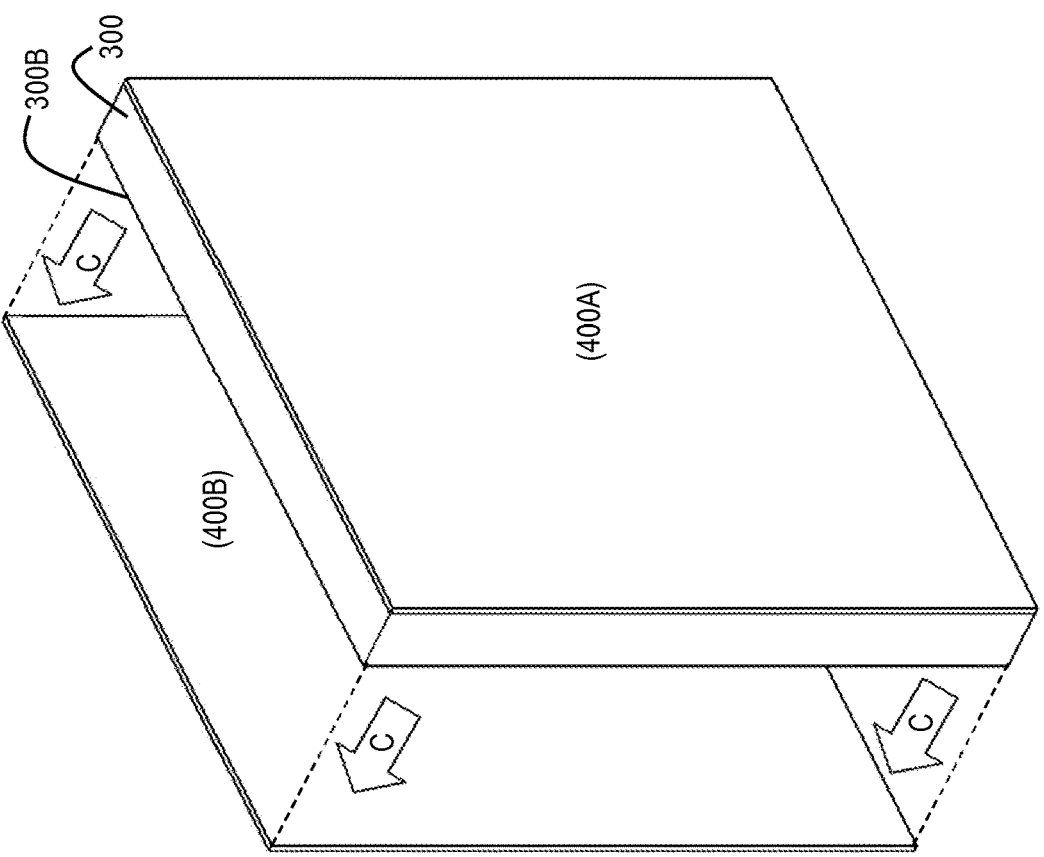
FIG. 7 illustrates the first configuration of the removal of one removable film from the rear surface of the primer saturated medium assembly, according to at least one embodiment disclosed herein.

FIG. 7 illustrates the first configuration of the removal of the opposing, second removable film 400B from the opposing, second face 300B of the primer saturated carrier medium 300 to expose the primer 200 on the opposing, second face 300B in preparation for application to a surface 705 of a structure 700, (for example, shown in FIG. 8). Arrows in direction C illustrate the direction of removal of the opposing, second removable film 400B from the opposing, second face 300B of the primer saturated carrier medium 300.

FIG. 8 illustrates the first configuration of a surface 705 of a structure 700 capable of receiving the primer saturated carrier medium 300. For example, the surface 705 of the structure 700 may have a crack or other abnormality 710 that has damaged a portion of the structure 700. This damage 710 to the surface 705 of the structure 700 necessitates the application of the primer 200 held within the primer saturated carrier medium 300 to be applied to the surface 705 of the structure 700 surrounding the damage 710 for repair. The repair process may further include the application of adhesive to the primer saturated medium 300 and the surrounding area of the surface 705 of the structure 700 after the opposing, second removable film 400B is removed from the primer saturated carrier medium 300.

Figure 9:
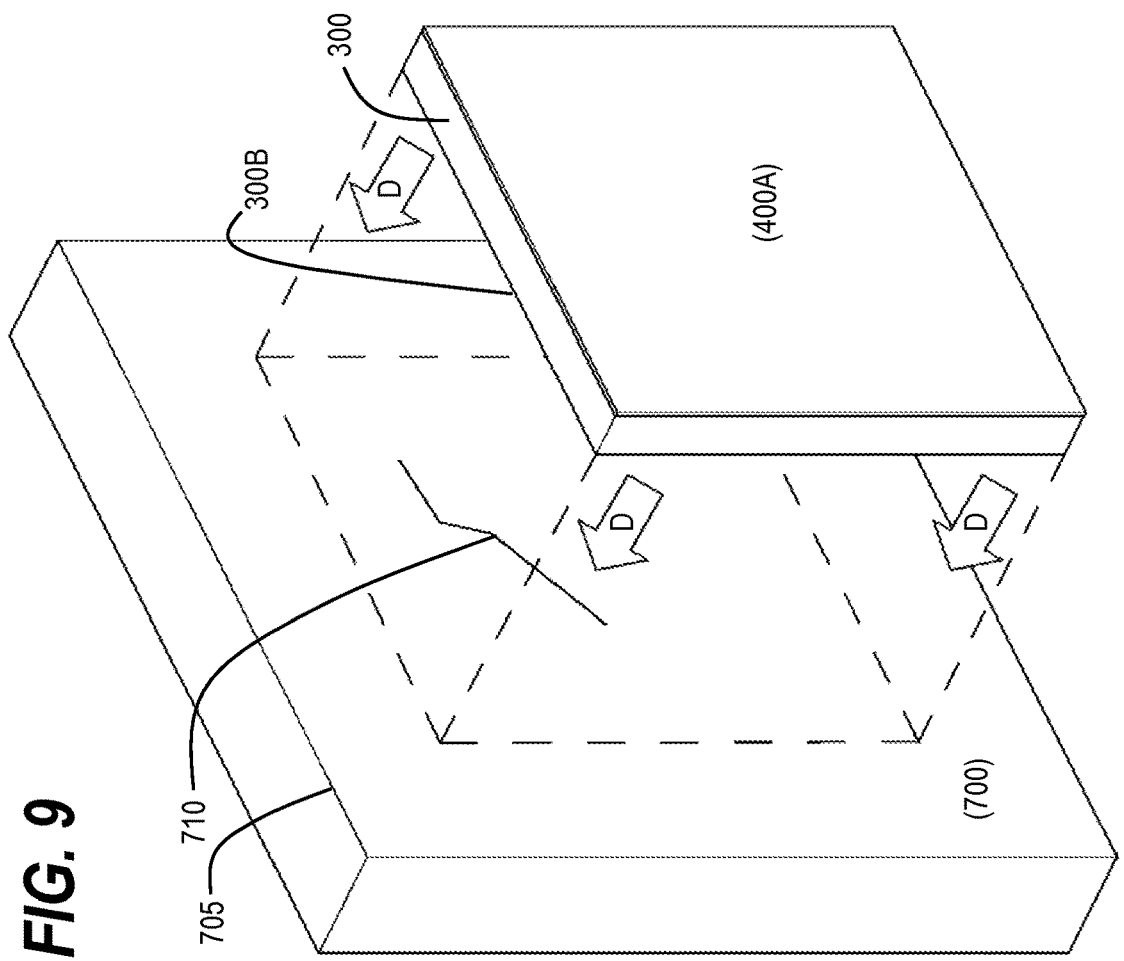
FIG. 9 illustrates the first configuration of the primer saturated carrier medium assembly being positioned over a surface of a structure, according to at least one embodiment disclosed herein.

FIG. 9 illustrates the first configuration of the primer saturated carrier medium 300 and the first removable film 400A being positioned over the surface 705 of the structure 700 proximate the damage 710. Arrows in direction D illustrate the direction of application of the primer exposed opposing, second face 300B of the primer saturated carrier medium 300 and the first removable film 400A relative to the surface 705 of the structure 700 with the damage 710.

Figure 10:
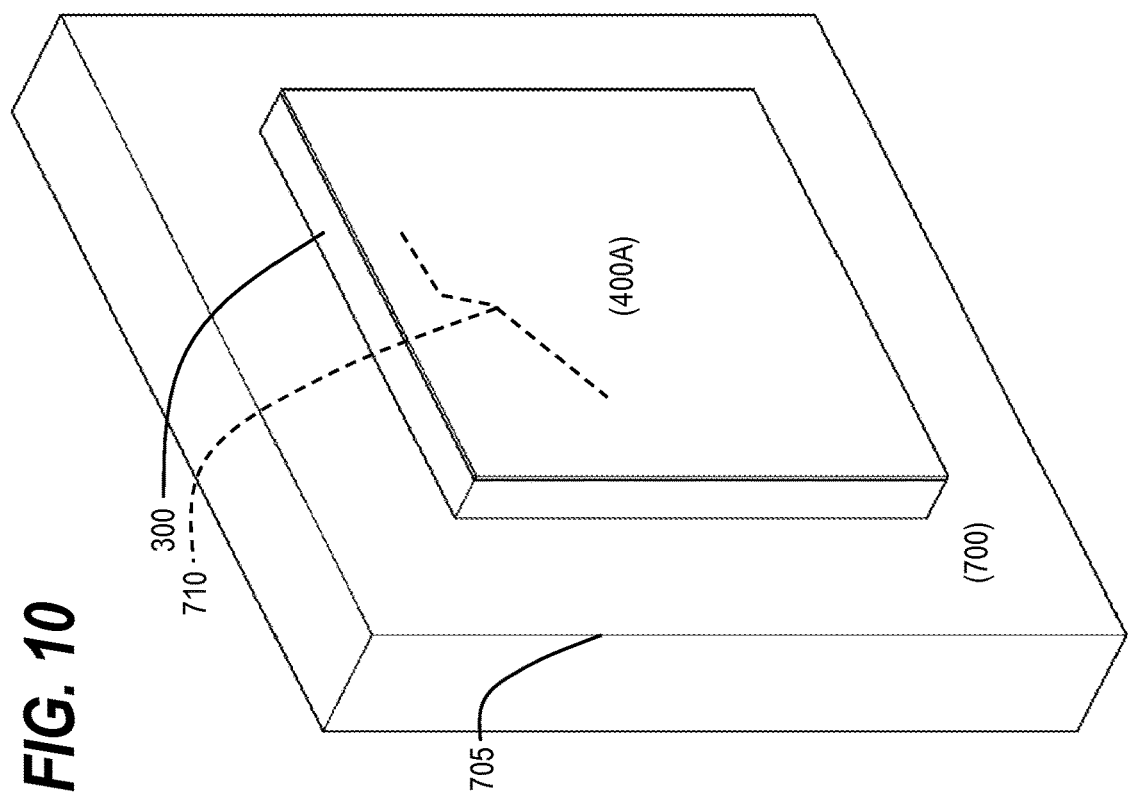
FIG. 10 illustrates the first configuration of the primer saturated carrier medium positioned in contact with the surface of the structure, according to at least one embodiment disclosed herein.

FIG. 10 illustrates the first configuration of the exposed primer opposing, second face 300B of the primer saturated carrier medium 300 positioned in contact with the surface 705 of the structure 700 completely covering the damage 710. At this stage, optionally, first removable film 400A may be removed (not shown), for curing the exposed primer 200 of the first face 300A of the primer saturated carrier medium 300 in ambient temperate air or other primer curing processes.

FIG. 11 illustrates an alternative configuration of curing the primer saturated carrier media 300 applied to the surface 705 of the structure 700. A heat curing device 800 may be positioned over the primer saturated carrier medium 300 and first removable film 400A positioned in contact with the surface 705 of the structure 700 that completely covers the damage 710. The heat curing device 800, in this exemplary instance which may include a heat blanket, may then heat cure the primer 200 in place in contact with the surface 705 of the structure 700, and in this example, with the first removable film 400A covering the first face 300A of the primer saturated carrier medium 300. Other exemplary curing methods for the primer may replace, be used in conjunction or used in sequence with the heat curing device 800 illustrated in FIG. 11. These other curing methods may include treating the primer saturated carrier medium 300 with infrared (IR) energy, with ultraviolet (UV) energy, or exposing the primer saturated carrier medium 300 to ambient temperature air to adhere the primer 200 to the surface 705 of the structure 700.

FIG. 12 illustrates the first configuration of the cured primer saturated carrier medium 300 having the first removable film 400A removed therefrom while remaining in position and in contact with the surface 705 of the structure 700, completely covering the damage 710. In an exemplary configuration, the carrier medium 100 may be a non-woven carbon mat or non-woven metallized carbon mat such that the application of the primer saturated medium may provide electrical conductivity across the surface of the structure through the non-woven carbon mat or the non-woven metallized carbon mat and around the damage 710. In a metallic structure, a high potential electric charge, for example, a lightning strike has many paths to travel. However, in a carbon fiber reinforced polymer material, discontinuities within the material, such as the exemplary damage 710 in structure 700, attract a concentration of a high potential electric charge that often leads to greater damage localized at the repaired location of the surface. A lightning strike may often lead to a repair patch positioned over the damage, (for example, damage 710), and may forcibly remove the repair patch from the structure. The application of a non-woven carbon mat or non-woven metallized carbon mat may provide electrical conductivity across the surface of the structure through the non-woven carbon mat or the non-woven metallized carbon mat and not through the damage 710 in the surface 705 thereby protecting that portion of the surface 705 of the structure 700 from damage by electric discharge.

FIG. 13 illustrates a logic flowchart diagram of a method of applying primer to a surface of a structure. A carrier medium 100 may be provided 1300 having first face 300A and opposing, second face 300B. The carrier medium 100 may be then saturated 1302 with a primer 200 to create a primer saturated carrier medium 300.

A first removable film 400A may be provided 1304 to cover a first face 300A of the primer saturated carrier medium 300, and an opposing, second removable film 400B may be provided to cover the opposing, second face 300B of the primer saturated carrier medium 300. First removable film 400A and opposing, second removable film 400B are impenetrable to the primer 200. The primer saturated carrier medium 300 may be substantially saturated with the primer 200 with first removable film 400A and opposing, second removable film 400B applied thereto to form a primer saturated medium assembly 500.

Excess primer 200 may be removed 1306 from the primer saturated carrier medium 300. Pressure may be applied 1308 to the primer saturated carrier medium 300 to produce a controllable thickness T between the first face 300A of the primer saturated carrier medium 300 and opposing, second face 300B of the primer saturated carrier medium 300 of the primer saturated medium assembly 500.

The primer saturated medium assembly 500 may be placed 1310 within a hermetically sealed enclosure and the hermetically sealed enclosure containing the primer saturated medium assembly 500 may be stored 1312 in one of cold temperature storage or ambient temperature storage.

The opposing, second removable film 400B may be removed 1314 from the opposing, second face 300B of the primer saturated carrier medium 300 thereby exposing the primer 200 on the opposing, second face 300B of the primer saturated carrier medium 300.

The primer exposed opposing, second face 300B of the primer saturated carrier medium 300 may then be applied 1316 to the surface of the structure 700, where first removable film 400A may either remain, covering a first face 300A of the primer saturated carrier medium 300, or may be removed, dependent upon the type of curing to be applied to the primer 200 in the primer saturated carrier medium 300.

The primer 200 of the primer saturated carrier medium 300 may be then cured 1318 in place, and in contact with the surface of the structure 700 while first removable film 400A remains covering the opposing, second face 300B of the primer saturated carrier medium 300 in this exemplary configuration. First removable film 400A may then be removed 1320 from the primer saturated carrier medium 300 after the primer 200 has been cured in place, and in contact with the surface of the structure 700 and covered, for example with an adhesive or other coating.

The configurations presented herein apply primer 200 to a surface 705 of a structure 700 to be repaired such that primer spraying applications are eliminated, thus reducing environmental hazards such as breathing fumes from the application of an atomized bond primer. The method of primer application by means of the primer saturated carrier medium 300 further does not require brushing applications resulting in uneven dispersal application of primer. Additionally, the configurations presented herein produce a consistent controllable thickness of primer applied to the surface 705 of the structure 700 within optimal specifications by first having the primer 200 saturate a carrier medium 100 of a predefined thickness, and by further calendaring the primer saturated carrier medium 300 to a controllable thickness before application to the surface 705 of the structure 700.

The configurations presented herein provide primer 200 for repair applications of a predetermined primer application thickness to reduce uneven primer applications. The predetermined primer application thickness may first be controlled by selecting a particular thickness of the primer medium 100 to carry the primer 200 therein. A secondary process to further control the primer application thickness may be to calendar that selected primer saturated carrier medium 300 by a mechanical process as depicted in FIG. 6 and its accompanying description above.

The configurations presented herein provide for timesaving benefits during application of primer to a surface of the structure, where the primer 200 in the repair patch may be co-cured with an adhesive thereby eliminating a separate primer curing and adhesive curing steps in the repair process.

The configurations presented herein may provide the carrier medium being made of a carbon fiber non-woven mat having electrically conductive properties, which may provide lightning strike protection for composite structures. A carrier medium containing carbon fiber non-woven materials may also be used to repair non-metallic composite structures.

The subject matter described above may be provided by way of illustration only and should not be construed as limiting. Various modifications and changes may be made to the subject matter described herein without following the example embodiments and applications illustrated and described, and without departing from the true spirit and scope of the present disclosure, which may be set forth in the following claims.

The invention claimed is:

1. A primer saturated carrier medium assembly comprising:
   a carrier medium having a first face and an opposing second face;
   an uncured primer saturating the carrier medium between the first face and the opposing second face;
   a first removable film impenetrable to the primer directly contacting the first face of the primer saturated carrier medium; and
   a second removable film impenetrable to the primer directly contacting the opposing second face of the primer saturated carrier medium.

2. The primer saturated carrier medium assembly of claim 1, wherein the carrier medium comprises a non-woven mat including at least one of nylon, polyester or glass.

3. The primer saturated carrier medium assembly of claim 1, wherein the carrier medium further comprises carbon fibers that form a non-woven carbon mat that provides electrical conductivity across a surface to which the carrier medium is applied.

4. The primer saturated carrier medium assembly of claim 3, wherein the carbon fibers are metallized with at least one of Ni, Cu/Ni, Ag, Au or Ru.

5. The primer saturated carrier medium assembly of claim 1, wherein the primer comprises a chromate-based corrosion resistant primer.

6. The primer saturated carrier medium assembly of claim 1, wherein the first and second removable films comprise one of nylon, polyester or glass.

7. A method of applying primer to a surface comprising:
removing a first film impenetrable to a primer directly contacting an opposing second face of a primer saturated carrier medium assembly comprising:
a carrier medium having a first face and the opposing second face,
an uncured primer saturating the carrier medium between the first face and the opposing second face, and
a second film impenetrable to the primer directly contacting the first face of the carrier medium;
applying the opposing second face of the primer saturated carrier medium assembly to contact the surface; and
curing the primer saturated carrier medium on the surface.

8. The method of claim 7, wherein the primer saturated carrier medium comprises a non-woven mat comprising at least one of nylon, polyester or glass.

9. The method of claim 7, wherein the primer saturated carrier medium further comprises carbon fibers.

10. The method of claim 7, further comprising:
removing an opposing second removable film from the primer saturated carrier medium after curing the primer saturated carrier medium on the surface.

11. The method of claim 7, wherein curing comprises one of:
heating the primer saturated carrier medium to adhere the primer to the surface;
treating the primer saturated carrier medium with infrared (IR) energy to adhere the primer to the surface;
treating the primer saturated carrier medium with ultraviolet (UV) energy to adhere the primer to the surface; or
exposing the primer saturated carrier medium to ambient temperature air to adhere the primer to the surface.

12. The method of claim 7, wherein the primer may be a chromate-based corrosion resistant primer.

13. A structure comprising:
a primer saturated medium comprising:
a carrier medium having a first face and an opposing second face,
an uncured primer saturating the carrier medium between the first face and the opposing second face,
a first removable film impenetrable to the primer directly contacting the first face of the primer saturated carrier medium, and
a second removable film impenetrable to the primer directly contacting the opposing second face of the primer saturated carrier medium,
the primer saturated medium capable of adhering to a surface at one face of the primer saturated medium.

14. The structure of claim 13, wherein the primer is a chromate-based corrosion resistant primer.

15. The structure of claim 13, wherein the carrier medium comprises a non-woven mat including at least one of nylon, polyester, or glass.

16. The structure of claim 13, further comprising an adhesive adhered to the primer saturated medium on an opposing face, and a repair patch applied over the adhesive.

17. The structure of claim 13, wherein the surface further includes a carbon fiber structure.

18. The structure of claim 17, wherein the carrier medium further comprises carbon fibers.

19. The structure of claim 17, wherein the carrier medium further comprises carbon fibers metallized with at least one of Ni, Cu/Ni, Ag, Au or Ru.

20. An aircraft comprising the primer saturated carrier medium assembly of claim 1.

* * * * *